Patented Feb. 7, 1950

2,496,848

UNITED STATES PATENT OFFICE 2,496,848

PRODUCTION OF CRYSTALLINE PENICILLIN SALTS

Finn W. Bernhart, Solon, Ohio, assignor to Wyeth Incorporated, Philadelphia, Pa., a corporation of Delaware No Drawing. Application April 25, 1944, Serial No. 532,649

8 Claims. (Cl. 260—302)

This invention pertains to the preparation of substantially pure crystalline salts of penicillin.

Following Dr. Fleming's crucial and timely observation that certain molds related to *Penicillium notatum* exhibited a bacteriostatic effect on *Staphylococcus aureus* and the publication of his findings and those of Chain et al., many intensive investigations have been made in the United States and Great Britain to isolate in a pure crystalline form the substance producing the penicillin bacteriostatic activity. For instance, in The Lancet, issue of August 16, 1941, Florey et al., reported the preparation of an impure penicillin active substance having an activity of 40 to 50 units per mg. Their process for obtaining a substance of this activity consisted of extracting acidified penicillin crude culture liquor with amyl acetate, transferring the penicillin active substance from the resulting amyl acetate extract to an aqueous solution of barium hydroxide, acidifying the barium hydroxide solution, extracting the acidic solution with ether, passing the ethereal extract through an adsorption column of Brockmann's alumina, eluting certain sections of the column with a phosphate buffer (pH 7.2), extracting the phosphate eluate with ether, and finally extracting the penicillin active substance back into water using sodium hydroxide to adjust the pH. More recently, June 1942, E. P. Abraham and E. Chain, two of Dr. Florey's coworkers, reported the isolation of a non-crystalline substance having a penicillin activity of 450 to 500 units per mg., and appearing homogeneous on a chromatographic adsorption column. Their isolation procedure was essentially the same as Florey's, except the chromatographic adsorption of the penicillin active substance on alumina was performed five times and between the second and third alumina adsorption, the penicillin active substance was converted to a solution of its barium salt and subjected to a reducing treatment with aluminum amalgam.

One object of this invention is to isolate a substantially pure crystalline penicillin active substance.

A further object of the invention is to provide a relatively simple and effective process for isolating a pure crystalline substance of high penicillin potency from partially purified preparations having a substantial penicillin activity.

A specific object of the invention is to prepare substantially pure relatively non-hygroscopic crystalline compounds which are alkali metal or alkaline earth metal salts of an acid having 16 carbon atoms in its structure and which have a penicillin activity of about 1600 or more units per mg. For the purposes of this application the ammonium salt is considered included among the alkali metal salts.

According to my invention, an impure preparation having a penicillin potency of about 1000 units per mg. or more, such as a so-called calcium penicillin of that activity, is dissolved in a minimum amount of a solvent, for instance, distilled water, to produce an approximately saturated solution, and then a solid salt such as a neutral one, or a saturated solution thereof is added in small portions until a definite turbidity appears, after which the solution is allowed to stand. The crystals that gradually form, are filtered off, taken up in an anhydrous organic solvent such as acetone, filtered, and enough of an anhydrous organic inert non-solvent liquid such as ether is added to produce a turbidity. Upon standing, crystals of a pure compound having a penicillin potency of about 1600 or more units per mg. precipitate out from the turbid solution and are filtered off and carefully dried. Upon analysis, the crystals are found to correspond to the empirical formula Me-$(C_{16}H_{18}N_2O_5S)n$, where Me represents a metallic cation, and $n$ corresponds to the valency of the metallic cation, and which empirical formula may possibly include one molecule of water of crystallization. In general, the metallic cation is the same as that of the salt selected to "salt out" the penicillin active substance from its concentrated aqueous solutions instead of the cation of the salt of the penicillin active substance with which one starts.

For the "salting out" operation, I prefer to employ a neutral salt having a high degree of water solubility such as disodium sulfate, diammonium sulfate, calcium chloride, barium chloride, magnesium sulfate, strontium chloride, ammonium chloride, sodium chloride, potassium chloride, magnesium chloride, lithium chloride, trisodium citrate and the like. I prefer also to carry out the "salting out" operation at a pH value between 5.5 and 7.0. By so proceeding I found that it is possible to crystallize out the compounds with high penicillin activity from impure preparations having a penicillin activity of about 1000 units per mg., even though the crystalline compounds cannot be crystallized directly from an organic solution of the same impure preparations. Once the highly potent compounds have been isolated in crystalline form, it is then readily possible to crystallize and purify them further from suitable inert low boiling anhydrous organic solvents and mixtures of such organic solvents particularly hydroxylated and/or ketonic types such as methyl alcohol and methyl ethyl ketone. Preferably such solvents are employed in conjunction with an anhydrous low boiling organic liquid which is chemically inactive with the crystalline penicillin active substance and substantially without solvent action thereon such as petroleum ether, dibutyl ether, diisopropyl ether, ethylene dichloride and chloroform.

The following specific example will serve to illustrate and explain my process for isolation of the substantially pure crystalline salts having a penicillin activity of about 1600 or more units per mg., although it will be understood that I do not desire to be limited to the specific proportions or details recited therein.

*Example*

A dried calcium salt (0.44 gm.), assaying by the *Staphylococcus aureus* turbidimetric assay 1200 units per mg., was dissolved in 3 cc. of water and the insoluble residue (calcium carbonate) filtered off. The volume of the filtered solution plus washings was 10 cc. One cc. of 3% sodium phosphate buffer solution saturated with ammonium sulfate and having a pH of 6.8 was added and then solid ammonium sulfate was introduced in small portions until a slight turbidity appeared. After standing at 0° C. overnight, the crystalline material was centrifuged off and washed once with 8 cc. of 3% sodium phosphate buffer 0.8 saturated with ammonium sulfate. After centrifugation and removal of the wash liquor, one cc. of anhydrous acetone was flowed on to the crystals to produce a clear solution. A further addition of 5 cc. of anhydrous acetone was made to cause precipitation of the residual inorganic neutral salts, after which the acetone solution was separated and 10 cc. more of anhydrous acetone added. Anhydrous, peroxide-free ethyl ether was added to the clear acetone solution until a turbidity appeared, and the turbid solution was allowed to stand overnight in a cold room at 0° C. to bring about separation of the sought for crystalline material. After re-crystallization from anhydrous acetone and anhydrous ether, the crystals were washed with anhydrous ether and dried over phosphorus pentoxide in vacuo. In this manner 160 mg. of crystalline, substantially pure, relatively non-hygroscopic ammonium salt having a penicillin activity of about 1600 units per mg. was obtained. By chemical analysis, the substantially pure substance had an empirical formula of $NH_4C_{16}H_{18}N_2O_5S$ including probably one molecule of water of crystallization. The crystals seemed to have a double melting point, melting first at 103 to 106° C., solidifying about 106° C., and melting again at 137–142° C.

The impure preparations used as starting material and having a penicillin activity of about 1000 units per mg. or more, can be prepared by the known conventional procedures such as those described by Chain et al., particularly when supplemented by the fractionating action of repeated chromatographic adsorptions on alumina and elutions. It is, however, definitely desirable in the operation of the process of the present invention to start with preparations having a minimum activity of about 1000 units per mg.

It is desirable in carrying out the various operations, that the temperature be kept below about 20 to 25° C., and preferably in the crystallization phase, the temperature is maintained at about 0° C.

Other crystalline salts such as barium, calcium, magnesium, potassium, sodium and lithium may be prepared in a similar fashion. Thus to prepare a crystalline substantially pure calcium compound having a high penicillin activity comparable to that of the crystalline ammonium compound, one may substitute calcium acetate for the ammonium sulfate in the "salting out" operation; to prepare the substantially pure sodium compound, one may replace the ammonium sulfate with sodium chloride, etc.

The units per mg. of penicillin activity and the *Staphylococcus aureus* turbidimetric method of assaying the products referred to above are those commonly accepted in this field and are specifically described by J. W. Foster, Journal of Biological Chemistry, vol. 144, pages 285–286 (1942), Abraham et al., Lancet, vol. 2, pages 177–188 (1941), and Florey et al., British Journ. Exptl. Pathology, vol. 23, pages 120–123, (1942). Briefly, the unit is that amount of penicillin that will just inhibit completely the growth of the test strain of *S. aureus* in 50 ml. of medium.

As will be understood by those skilled in the art, various modifications of the present invention as hereinbefore set forth may be performed without departure from the spirit of the invention as defined in the appended claims.

I claim:

1. A process of preparing a substantially pure, crystalline salt having a penicillin activity of about 1600 units per mg., comprising crystallizing from an aqueous solution a partially purified preparation, derived from a culture broth of *Penicillium notatum* and having a potency of about 1000–1200 units per mg., in the presence of a highly water-soluble neutral salt, separating the crystals, and recrystallizing the same from an organic solvent.

2. A process of preparing a substantially pure, crystalline salt having a penicillin activity of about 1600 units per mg., comprising dissolving a partially purified preparation, derived from a culture broth of *Penicillium notatum* and having a potency of about 1000–1200 units per mg., in an aqueous solvent to form a concentrated solution, treating the concentrated solution with a highly water-soluble neutral salt to produce a turbidity at a pH of 5.5 to 7.0, allowing the turbid solution to crystallize, separating the crystals, and recrystallizing the same from an organic solvent.

3. A process of preparing a substantially pure, crystalline salt having a penicillin activity of about 1600 units per mg., comprising dissolving a partially purified preparation, derived from a culture broth of *Penicillium notatum* and having a potency of about 1000–1200 units per mg., in water to form a concentrated solution, treating the concentrated solution with a highly water-soluble, neutral salt to produce turbidity, allowing the turbid solution to crystallize, separating the crystals, and recrystallizing the same from an organic solvent.

4. A process of preparing a substantially pure, crystalline salt having a penicillin activity of about 1600 units per mg., comprising dissolving a partially purified preparation, derived from a culture broth of *Penicillium notatum* and having a potency of about 1000–1200 units per mg., in water to form a concentrated solution, treating the concentrated solution with a highly water-soluble, neutral salt to produce turbidity, allowing the turbid solution to crystallize, separating the crystals, dissolving the crystals in an organic solvent, adding an organic liquid having less solvent action to produce a turbidity, and permitting crystallization to occur.

5. A process of preparing a substantially pure, crystalline salt having a penicillin activity of about 1600 units per mg., comprising dissolving a partially purified preparation, derived from a culture broth of *Penicillium notatum* and having a potency of about 1000–1200 units per mg., in water to form a concentrated solution, treating the concentrated solution with a highly water-soluble ammonium salt to produce turbidity at a pH of 5.5 to 7.0, allowing the turbid solution to crystallize, separating the crystals and recrystallizing the same from a mixture of an aliphatic ketone and an ether.

6. A process of preparing a substantially pure, crystalline salt having a penicillin activity of about 1600 units per mg., comprising dissolving a partially purified preparation, derived from a culture broth of *Penicillium notatum* and having a potency of about 1000–1200 units per mg., in water to form a concentrated solution, treating the concentrated solution with a highly water-soluble ammonium salt to produce turbidity, allowing the turbid solution to crystallize, separating the crystals, and recrystallizing the same from a mixture of acetone and diethyl ether.

7. A process of preparing a substantially pure crystalline salt having a penicillin activity of at least 1600 units per mg. which comprises dissolving a partially purified calcium penicillin preparation, derived from a culture broth of *Penicillium notatum* and having a penicillin activity of at least 1000 but less than 1600 units per mg., in a minimum amount of water, adding to the resultant solution ammonium sulfate in concentration and amount sufficient to produce turbidity while buffering the mixture to pH 5.5–7.0, allowing the turbid solution to crystallize, separating the crystals so formed, dissolving the crystals in an organic solvent in which said ammonium sulfate and the water-soluble buffer salts are substantially insoluble, clarifying the resultant solution, and crystallizing the desired product from the clarified solution while throughout the operations avoiding a temperature rise above about 25° C.

8. In a process of preparing a substantially pure crystalline salt having a penicillin activity of at least 1600 units per. mg., the steps which comprise: dissolving a partially purified penicillin product derived from a culture broth of *Penicillium notatum* and having a penicillin activity of at least 1000 but less than 1600 units per mg. in a minimum amount of water while buffering the mixture to pH 5.5–7.0, adding a neutral highly water-soluble salt in concentration and amount sufficient to cause the precipitation of penicillin-active crystals on standing, and recrystallizing the resulting crystals from an organic solvent.

FINN W. BERNHART.

REFERENCES CITED

The following references are of record in the file of this patent:

FOREIGN PATENTS

| Number | Country | Date |
| --- | --- | --- |
| 545,419 | Great Britain | May 26, 1946 |

OTHER REFERENCES

British J. of Exp. Pathology, vol. 23, pp. 103–119 June 23, 1942. (Cited in Squibb Pamphlet page 22.)

Science, vol. 96, No. 2479 pages 20, 21, July 3, 1942.

Penicillin "An Annotated Bibliography" by Squibb, July 1943, p. 24.

Committee on Medical Research of The Office of Scientific Research and Development, Coghill, Nos. 14 and 15, pp. 5 and 7 respectively, Sept. 6, 1943.

"Penicillin" by Abbot, page 48, 1944.